US010966005B2

(12) United States Patent
Sadasivarao et al.

(10) Patent No.: US 10,966,005 B2
(45) Date of Patent: Mar. 30, 2021

(54) STREAMING TELEMETRY FOR OPTICAL NETWORK DEVICES

(71) Applicant: Infinera Corporation, Sunnyvale, CA (US)

(72) Inventors: Abhinava Sadasivarao, Milpitas, CA (US); Sharfuddin Syed, San Jose, CA (US); Sachin Jain, Bangalore (IN); Lu Biao, Saratoga, CA (US); Ashok Kunjidhapatham, Bangalore (IN); Anthony Jorgenson, Fremont, CA (US); Tjandra Trisno, San Jose, CA (US); Mana Palai, San Jose, CA (US); Biju Mathew, Fremont, CA (US); Mohit Misra, Bangalore (IN); Balaji Gopalakrishnan, Bangalore (IN)

(73) Assignee: Infinera Corporation, San Jose, CA (US)

( * ) Notice: Subject to any disclaimer, the term of this patent is extended or adjusted under 35 U.S.C. 154(b) by 0 days.

(21) Appl. No.: 16/298,671

(22) Filed: Mar. 11, 2019

(65) Prior Publication Data
US 2019/0281373 A1 Sep. 12, 2019

Related U.S. Application Data

(60) Provisional application No. 62/641,039, filed on Mar. 9, 2018.

(51) Int. Cl.
*H04B 10/07* (2013.01)
*H04Q 11/00* (2006.01)
(Continued)

(52) U.S. Cl.
CPC ....... *H04Q 11/0067* (2013.01); *H04L 41/046* (2013.01); *H04Q 11/0005* (2013.01);
(Continued)

(58) Field of Classification Search
None
See application file for complete search history.

(56) References Cited

U.S. PATENT DOCUMENTS

| 6,108,113 A * | 8/2000 | Fee ................... H04B 10/03 398/1 |
| 6,632,032 B1 * | 10/2003 | Dombrowski ....... H04B 10/075 398/100 |

(Continued)

OTHER PUBLICATIONS

Paolucci et al., Demonstration of gRPC Telemetry for Soft Failure Detection in Elastic Optical Networks, 2017 (Year: 2017).*
(Continued)

*Primary Examiner* — Jai M Lee
(74) *Attorney, Agent, or Firm* — David L. Soltz

(57) ABSTRACT

A telemetry manager receives, from a network server, global data collection information about network components in an optical network device. The global data collection information includes identifiers for network nodes in the network components from which telemetry data are to be collected, and reporting frequency and encoding format for sending collected telemetry data to the network server. The telemetry manager identifies, from the global data collection information, local data collection information specified for a network component, and sends this information to a telemetry agent in the network component. The telemetry manager receives telemetry data generated by a network node of the network component, where the data is provided according to instructions in the local data collection information. The telemetry manager converts the telemetry data from its native format to an encoding format specified by the global data collection information, and sends the encoded telemetry data to the network server.

22 Claims, 6 Drawing Sheets

(51) Int. Cl.
*H04L 12/24* (2006.01)
*H04L 29/06* (2006.01)
*H04J 14/02* (2006.01)

(52) U.S. Cl.
CPC ........... *H04B 10/07* (2013.01); *H04J 14/0201* (2013.01); *H04L 69/08* (2013.01); *H04Q 2011/0041* (2013.01); *H04Q 2011/0081* (2013.01); *H04Q 2011/0083* (2013.01)

(56) References Cited

U.S. PATENT DOCUMENTS

| | | | |
|---|---|---|---|
| 10,038,494 B1* | 7/2018 | Paraschis | H04B 10/032 |
| 10,148,497 B1* | 12/2018 | Roche | H04L 41/0853 |
| 10,313,828 B1* | 6/2019 | Burcham | H04W 4/021 |
| 10,362,141 B1* | 7/2019 | Thompson | H04L 45/22 |
| 2002/0165962 A1* | 11/2002 | Alvarez | H04L 41/22 |
| | | | 709/226 |
| 2002/0178258 A1* | 11/2002 | Hushing | H04Q 9/02 |
| | | | 709/224 |
| 2003/0016410 A1* | 1/2003 | Zhou | H04Q 11/0062 |
| | | | 398/5 |
| 2003/0138251 A1* | 7/2003 | Jayaram | H04B 10/07955 |
| | | | 398/38 |
| 2004/0006619 A1* | 1/2004 | Syed | H04L 43/0817 |
| | | | 709/224 |
| 2004/0153698 A1* | 8/2004 | Guzman | H04L 41/0663 |
| | | | 714/4.1 |
| 2004/0223759 A1* | 11/2004 | Fee | H04B 10/079 |
| | | | 398/33 |
| 2006/0090096 A1* | 4/2006 | Guzman | H04L 67/14 |
| | | | 714/4.3 |
| 2010/0322089 A1* | 12/2010 | Raja | H04L 43/04 |
| | | | 370/252 |
| 2013/0018632 A1* | 1/2013 | Field | G06Q 30/0242 |
| | | | 702/183 |
| 2013/0051795 A1* | 2/2013 | Freiberger | H04J 14/0221 |
| | | | 398/34 |
| 2016/0204992 A1* | 7/2016 | Wu | H04L 43/00 |
| | | | 709/224 |
| 2016/0277103 A1* | 9/2016 | Johnson, IV | H04B 10/0793 |
| 2016/0346696 A1* | 12/2016 | Liu | A63F 13/355 |
| 2018/0131745 A1* | 5/2018 | Shakir | H04L 41/0853 |
| 2018/0241802 A1* | 8/2018 | Bernat | H04L 67/101 |
| 2018/0262585 A1* | 9/2018 | Zandi | H04L 43/08 |
| 2018/0278496 A1* | 9/2018 | Kulshreshtha | H04L 41/145 |
| 2018/0285596 A1* | 10/2018 | Jones | G06F 21/552 |
| 2018/0359184 A1* | 12/2018 | Inbaraj | H04Q 9/00 |
| 2019/0140415 A1* | 5/2019 | Sun | H01S 5/1215 |
| 2019/0190928 A1* | 6/2019 | Anderson | H04L 63/1425 |

OTHER PUBLICATIONS

"openconfig-telemetry-types.yang", dated Dec. 11, 2018, reprinted from https://github.com/openconfig/public/blob/master/release/models/telemetry/openconfig-telemetry-types.yang on Nov. 4, 2019.

"openconfig-telemetry.yang", dated Dec. 11, 2018, reprinted from https://github.com/openconfig/public/blob/master/release/models/telemetry/openconfig-telemetry.yang on Nov. 4, 2019.

Borman, Paul, et al., "gRPC Network Management Interface (gNMI)", dated Feb. 1, 2018, reprinted from https://github.com/openconfig/reference/blob/master/rpc/gnmi/gnmi-specification.md on Nov. 4, 2019.

* cited by examiner

STREAMING TELEMETRY FOR OPTICAL NETWORK DEVICES

CROSS REFERENCE TO RELATED APPLICATIONS

This application claims the benefit of U.S. Provisional Patent Application No. 62/641,039, filed Mar. 9, 2018, which is incorporated herein by reference in its entirety.

BACKGROUND

The following disclosure relates generally to streaming telemetry for optical network devices.

Some systems use optical network devices in optical networks to transmit data over optical fiber links. The optical network devices generate performance monitoring data related to the operation of the network devices.

SUMMARY

The present disclosure describes systems, apparatus and methods to perform streaming telemetry for optical network devices. In some implementations, an optical network device (also referred to as an "optical network element (NE)") includes a control module with circuitry running a telemetry manager. The optical network device also includes one or more network components, each with circuitry running a telemetry agent. The telemetry manager maintains, for all the network components, a global list of telemetry subscriptions that it receives from a remote collector server. A telemetry subscription specifies, for the corresponding network component, one or more types of performance monitoring (PM) data to be collected, the frequency at which the data is to be sent to collector server, and the encoding format in which the PM data is sent to the collector server. The telemetry manager sends, to each telemetry agent, telemetry subscription information that is specific to the network component on which the telemetry agent is running.

Each telemetry agent locally maintains a telemetry subscription that it receives from the telemetry manager. A telemetry agent collects, from one or more sensor points of the corresponding network component, PM data of the types specified by its telemetry subscription and sends the collected PM data to the telemetry manager in the control module, at a frequency specified by the corresponding telemetry subscription. Collected PM data is sent in the native format of the corresponding sensor point. In some implementations, a telemetry agent performs aggregation and summarization, allowing filtering of PM data, before sending the PM data to the telemetry manager.

The telemetry manager receives, from different telemetry agents, sets of PM data corresponding to the network components in the optical network device. Upon receiving a set of PM data, the telemetry manager converts the PM data from its native format to an encoding format for streaming that is specified by the telemetry subscription of the corresponding network component. Following the conversion, the telemetry manager streams the encoded PM data to the remote collector server.

In this context, telemetry refers to a process by which performance metrics or performance measurements are collected by a network device, e.g., the telemetry manager, from one or more sensor points and transmitted to one or more collector devices, e.g., the remote collector server, for performance monitoring, performance analytics, or both. Streaming refers to a flow of data from the network device to the one or more collector devices. The flow of data follows a push-based mechanism in which new data is sent as the data becomes available. The flow of data can be continuous over a period of time or intermittent, e.g., whenever new data becomes available and depending on the volume of data. Data refers to PM data, e.g., performance metrics or information about events, such as faults.

In some implementations, an optical network device as described above is an optical transport NE that is configured to connect network routers or switches over long distances using optical fiber links. The optical NE can be, for example, an integrated multi-bay optical network device, such as: a multi-bay device of OSI layer 1 (L1) digital switching chassis; a multi-bay device of optical domain layer 0 (L0) fixed or reconfigurable optical add-drop multiplexer (F/ROADM) chassis; or a heterogeneous multi-bay device block of having different numbers of digital switching and optical switching chassis. The optical NE can also be, for example, a disaggregated optical network device, such as a fully open transponder and line-system (e.g., F/ROADM or amplifier) optical chassis. The optical NE can also be, for example, a NE that is deployed in integrated single-vendor transponder and line-system configurations, or open line-system deployments.

In some implementations, network components in an optical network device include one or more of a L0 or L1 chassis, a L0 F/ROADM chassis, a digital terminal device chassis, or a L1 or L0 line card. In some implementations, an optical NE with a multi-bay configuration includes a master chassis, e.g., a L0 or L1 chassis, and one or more slave chassis, e.g., a L0 F/ROADM chassis, a digital terminal device chassis, or a L1 or L0 line card, among others.

In some implementations, sensor points in a network component correspond to network nodes of the network components, which include one or more optical interface equipment, such as switches; input or output ports, or both; or transceivers, among others. Additionally or alternatively, in some implementations, network nodes or sensor points in a network component include one or more logical interfaces, such as virtual local area networks (VLANs).

In some implementations, an optical NE with a multi-bay configuration includes the telemetry manager circuitry in the control module of the master chassis, while control modules of the master chassis and all the other network components include respective telemetry agent circuitry. A control module is also referred to as a supervisory modules or as a route processor. In some implementations, a control module houses and executes control and management plane operations for the optical NE. The architecture enables multiple different telemetry subscriptions (also referred to simply as "subscriptions"), where subscriptions for different network components can specify different types of PM data, different collection frequencies, or both. In some implementations, the telemetry manager and one or more telemetry agents in an optical NE support different subscriptions for multiple remote collector servers.

In some implementations, each subscription is uniquely identified based on one or more of frequency (cadence), sensor paths or encoding. In this context, frequency (cadence) refers to the time interval (e.g., in milliseconds or some other suitable time unit) at which the NE pushes a set of PM data to the remote collector server corresponding to the subscription. A sensor path refers to a list of one or more sensor points that record PM data e.g., performance metrics or events (e.g., faults), that are to be collected and sent to the collector server. Encoding refers to the data encoding format to be used for the streaming data sent to the collector server.

In some implementations, a subscription is cumulative, e.g., when sending data at a particular time, also re-send all data previously collected and sent. In some implementations, a subscription is incremental, e.g., when sending data at a particular time, only send the difference between the presently available data and the data sent at the most recent prior time instance (e.g., delta-based streaming). In some implementations, each subscription is stored as an electronic file, either in local memory or in a persistent configuration database that is accessible by the telemetry manager or the respective telemetry agent, as the case may be.

In a general aspect, a system comprises an optical network device that includes a controller node with a telemetry manager, which receives, from a network server, global data collection information about one or more network components corresponding to the optical network device, wherein the global data collection information includes one or more of identifiers for network nodes in the one or more network components from which telemetry data are to be collected, reporting frequency for sending collected telemetry data to the network server, or encoding format for sending collected telemetry data to the network server. The telemetry manager identifies, from the global data collection information, local data collection information specified for a particular network component of the one or more network components. The telemetry manager sends, to a telemetry agent included in the particular network component, the local data collection information. The telemetry manager receives, at a time subsequent to sending the local data collection information to the telemetry agent, particular telemetry data generated by a particular network node of the particular network component, the telemetry data provided in accordance with instructions included in the local data collection information, the particular telemetry data provided in a particular native format of the particular network node. The telemetry manager determines an encoding format specified by the global data collection information for forwarding collected data to the network server. The telemetry manager converts the particular telemetry data from the particular native format to the specified encoding format, and sends the particular telemetry data in the specified encoding format to the network server.

In some implementations, a telemetry agent in the above system receives, from the telemetry manager, the local data collection information. In accordance with the instructions included in the local data collection information, the telemetry agent controls the particular network node to collect the particular telemetry data generated by the particular network node in the particular native format. The telemetry agent sends the particular telemetry data in the particular native format to the telemetry manager at a first reporting frequency specified by the local data collection information.

Implementations of the above techniques include methods, apparatus, systems and computer program products. One such computer program product is suitably embodied in a non-transitory machine-readable medium that stores instructions executable by one or more processors. The instructions are configured to cause the one or more processors to perform the above-described actions.

Using the novel features described above and in the following sections of this disclosure, optical streaming telemetry capabilities are realized to collect PM data from optical network devices such as optical transport NEs. Prior telemetry technologies, such as those based on Simple Network Management Protocol (SNMP), employed "pull" and "polling" based mechanisms, in which the collector server would periodically query the network devices for PM data. This could be inefficient, e.g., when the optical network devices did not have any new data to report. Accordingly, the same data could be collected in multiple polls. In contrast to these prior technologies, the optical streaming telemetry implementations disclosed herein adopt "push"-based mechanisms, in which the optical network devices proactively report the data when such data becomes available. Accordingly, the inefficiencies of wasted polling rounds, e.g. when no new data is available, are avoided.

The disclosed optical streaming telemetry techniques and framework also allow for collecting PM data at much finer granularity, or with shorter response times, or both compared to pull or polling based mechanisms. For example, using the disclosed techniques, data can be streamed whenever the data is generated by a sensor point. The streaming can be, for example, in real time. In this manner, PM data can collected and processed in small quantities soon after the data is generated. In contrast, in the earlier technologies, data was collected only when the collector would poll the optical network devices, which could be, e.g., in intervals of tens of minutes. Accordingly, in the earlier technologies, the data collection was slower. In addition, the data would have lower granularity since the data would be collected only when polled, and not continuous, which is possible with the disclosed streaming techniques.

The disclosed telemetry techniques can be implemented on digital switching platforms (e.g., L1 devices, such as L1 line cards) and pure optical NEs (e.g., L0 devices, such as F/RAODM or optical amplifier). Using the telemetry subscription enables a flexible PM data collection model, e.g., an updated subscription can be sent to a network component when a different type of PM data is to be collected, or at different reporting frequency, or both.

In addition to optical network devices, the disclosed framework enables application of streaming telemetry features to a variety of other network devices, such as routers, switches, wireless access points, Internet of Things (IoT) devices, among others. A system implementing the disclosed techniques can realize PM data collection across a combination of optical network devices and these other network devices.

The disclosed techniques enable support for different collector servers that process PM data using different encoding mechanisms, e.g., Protocol Buffers (ProtoBuf), Thrift, Extensible Markup Language (XML), JavaScript Object Notation (JSON), or text encoding such as ASCII. Further, the disclosed techniques enable adapting sending of PM data sent from telemetry managers to collector servers over public or private networks using different transport and application layer protocols, such as Hypertext Transport Protocol (HTTP), HTTP version 2 (HTTP/2), Universal Datagram Protocol (UDP) or Transport Control Protocol (TCP). Different secure transport formats can be supported, such as Transport Layer Security (TLS) or Secure Shell (SSH), e.g., in case of TCP. The PM data also can be sent as unencrypted plain text, e.g., in case of UDP. In addition to performance monitoring, the collected PM data can be used for analytics. For example, by examining the data, the current state of the optical network, or of one or more optical network devices, can be determined and an expected state at a future time can be estimated, allowing corrective actions to be taken, e.g., pro-active protection switching, as needed.

The details of one or more disclosed implementations are set forth in the accompanying drawings and the description below. Other features, aspects, and advantages will become apparent from the description, the drawings and the claims.

BRIEF DESCRIPTION OF THE DRAWINGS

Like reference numbers in the figures indicate like elements.

DETAILED DESCRIPTION

Figure 1:
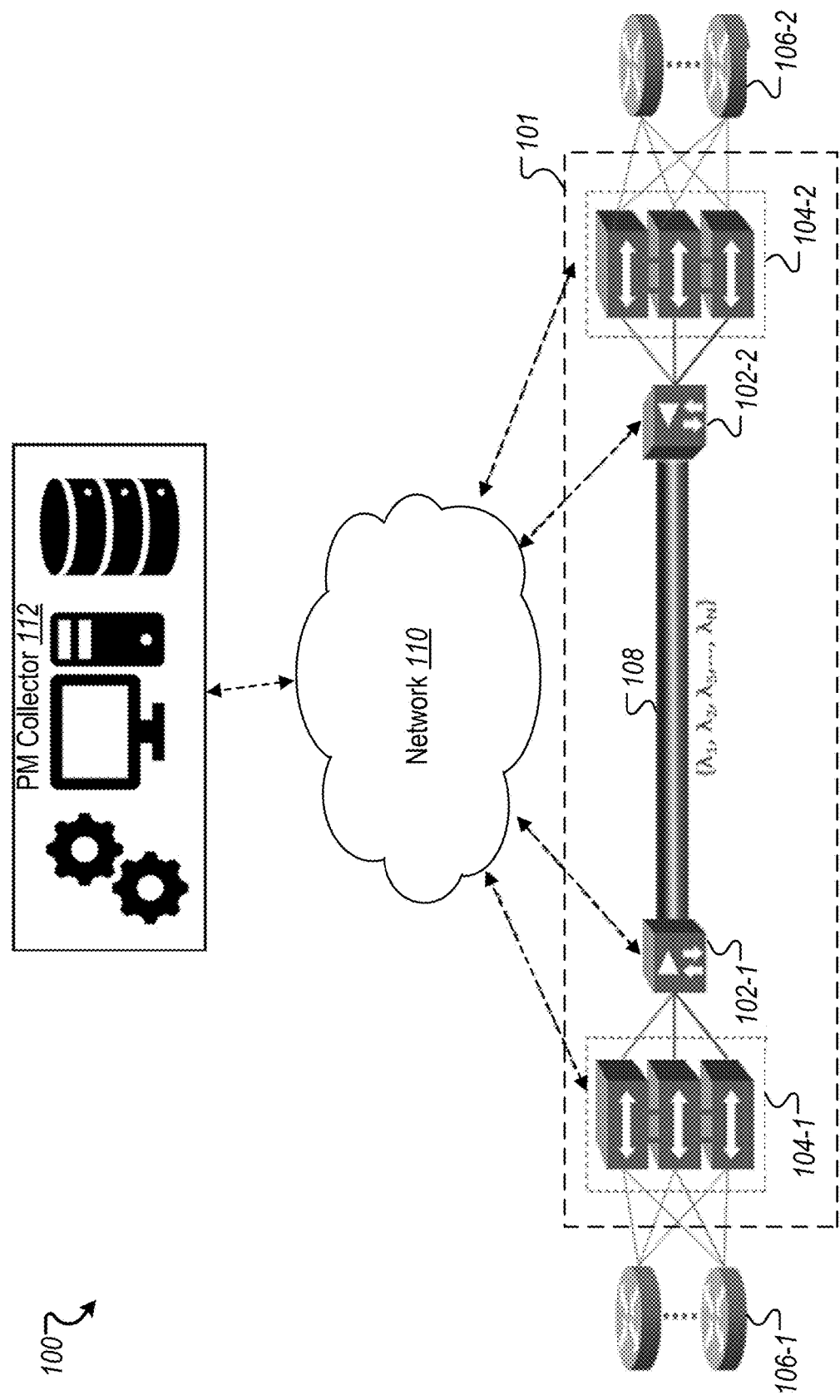
FIG. 1 illustrates an example of a system for streaming telemetry of network devices in an optical network.

FIG. 1 illustrates an example of a system 100 for streaming telemetry of network devices in an optical network 101. As shown, in the system 100, optical network 101 is connected, through network 110, to a PM collector 112. The optical network 101 includes optical NEs 102-1, 102-2, 104-1 and 104-2. The system 100 also includes network devices 106-1 and 106-2.

In some implementations, optical network 101 is an optical transport network that connects network devices such as routers or switches over long-distance optical fiber links. Network devices 106-1 and 106-2 are packet switched routers that transmit traffic such as Ethernet traffic, Fiber Channel traffic, Synchronous Optical Networking and Synchronous Digital Hierarchy SONET/SDH traffic, or Asynchronous Transfer Mode (ATM) traffic. Optical NEs 104-1 and 104-2 are each a collection of wavelength division multiplexed (WDM) terminal devices. Each of these WDM terminal devices map Ethernet traffic from the packet switched routers 106-1 and 106-2 to optical carriers at specific wavelengths. In some implementations, each of optical NEs 104-1 and 104-2 has multi-bay configurations with one or more terminal device chassis, which are together managed as a single device, as described in greater detail below.

In some implementations, optical NEs 102-1 and 102-2 are optical add-drop multiplexer (OADM) devices that multiplex the combined optical carriers from WDM terminal devices of the optical NEs 104-1 and 104-2, respectively. The functions of optical NEs 102-1 and 102-2 include wavelength multiplexing, and optical amplification among others. One or more of the optical NEs 102-1 and 102-2 can be erbium-doped fiber amplifiers (EDFA), or Raman amplifiers.

In some implementations, the optical NEs 102-1 and 104-1 are located at one physical site, while the optical NEs 102-2 and 104-2 are located at another, remote physical site. For example, optical NEs 102-1 and 104-1 can be located in Washington D.C., while the optical NEs 102-2 and 104-2 can be located in Silicon Valley. Data between the two sites is carried over optical fiber link 108, as the combined optical signal of the optical carriers from the WDM terminal devices, multiplexed by optical NEs 102-1 and 102-2.

In some implementations, one or more optical NEs in the network 101, e.g., optical NEs 102-1, 102-2, 104-1 and 104-2, collect PM data and stream the collected data to PM collector 112 through the network 110. The PM collector 112 is a server, or a platform of servers, that perform PM data archival or PM data analysis, or both. The PM collector 112 includes storage for storing the PM data received from different NEs. In some implementations, the PM collector 112 runs programs to decode, parse and process the data that is being received.

In some implementations, the PM collector 112 is in a remote location compared to the optical NEs of the network 101. As shown, the PM collector 112 is connected to the optical NEs through the network 110. In some implementations, the network 110 is a public network, or a collection of networks, such as the Internet. In some implementations, the network 110 is a private network, e.g., a long-distance dedicated private backhaul. In some implementations, the optical network 101 is a part of the network 110. The network 110 is also referred to as a data communications network (DCN) or a signaling communications network (SCN).

In some implementations, more than one PM collector, e.g., similar to PM collector 112, gathers PM data from optical NEs in the network 101. In such cases, different PM collectors can collect similar or different types of PM data from the optical NEs. Different PM collectors can collect data from similar to different groups of optical NEs in the network 101. Different PM collectors can specify, e.g., using subscriptions, transmission of PM data to the respective collectors using similar to different encoding formats.

As described below with respect to the examples of FIGS. 2A, 2B and 2C, each of the optical NEs 102-1, 102-2, 104-1 and 104-2 has a two-level hierarchical telemetry architecture that comprises of a telemetry manager and one or more telemetry agents. For example, each optical NE has a control module that includes telemetry manager circuitry to collect PM data from the constituent network components of the NE, and stream the collected data to PM collector 112. Each optical NE includes one or more network components with sensor points that are configured to record PM data, depending on the subscription. One or more of the network components each includes telemetry agent circuitry to manage the collection of PM data from the sensor points that are local to the respective network component, and send the collected data to the telemetry manager of the respective NE.

Figure 2A:
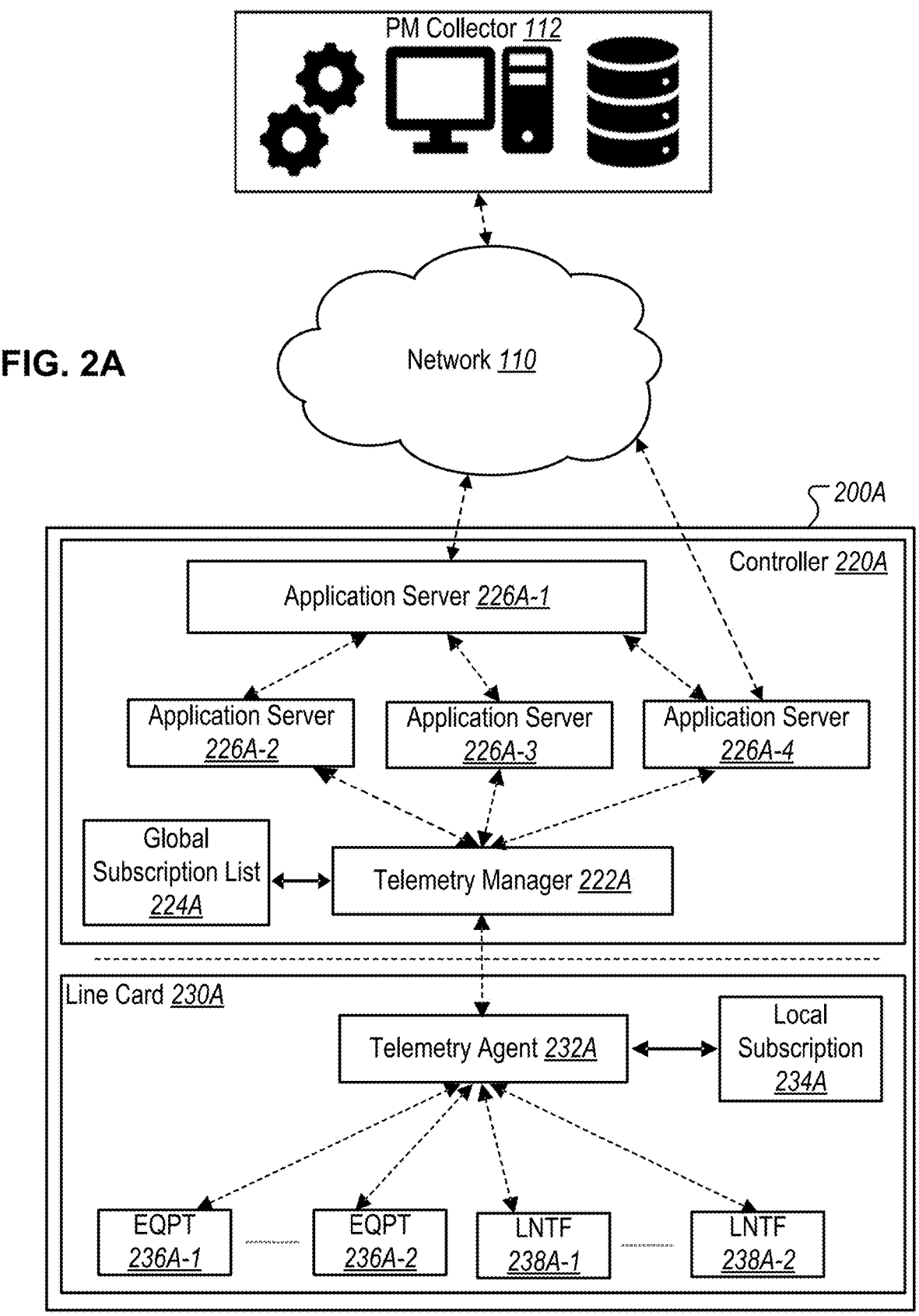
FIGS. 2A, 2B and 2C illustrate examples of optical network devices that support streaming telemetry.
Figure 2B:
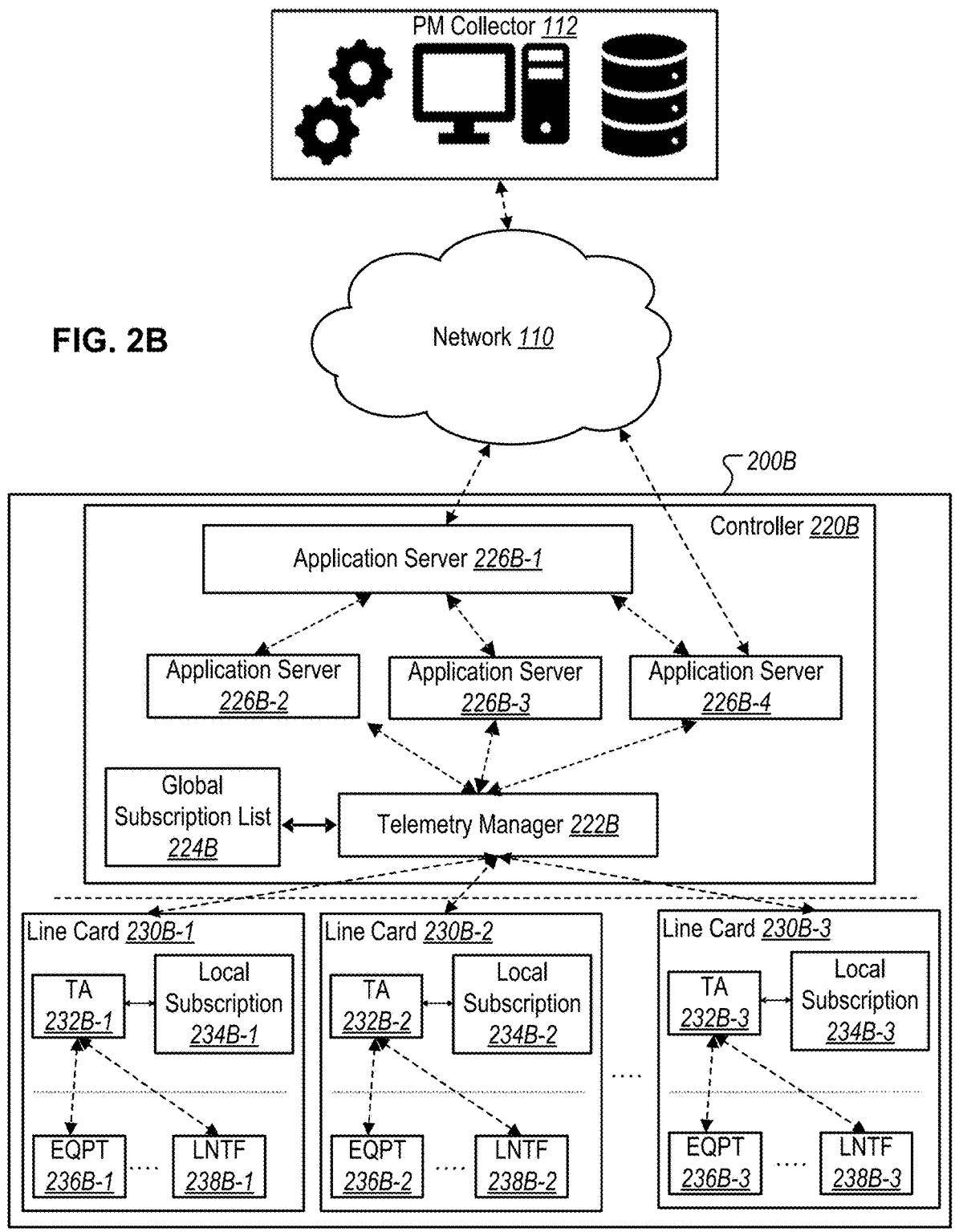
Figure 2C:
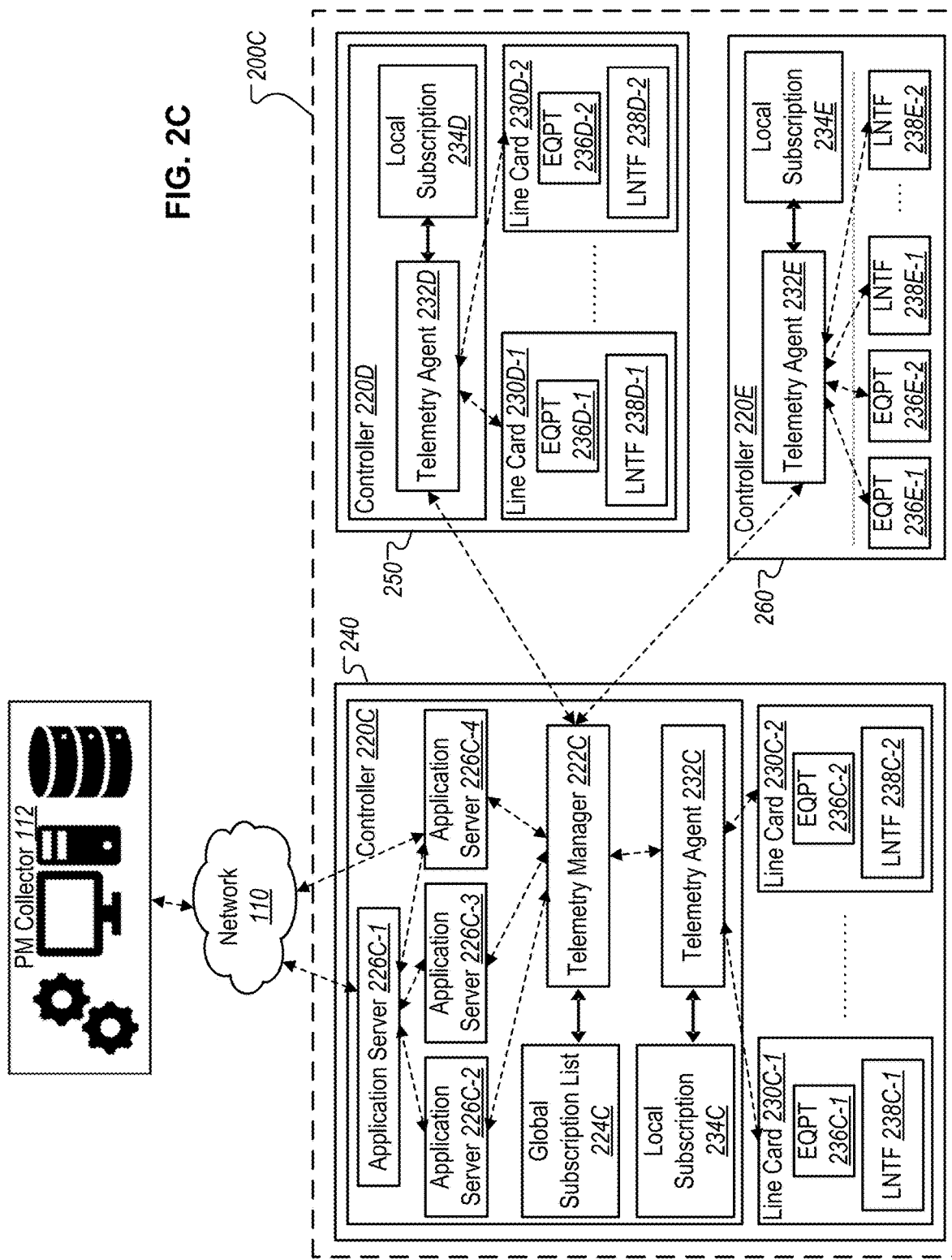

FIGS. 2A, 2B and 2C illustrate examples of optical network devices 200A, 200B and 200C, respectively, that support streaming telemetry. In some implementations, one or more of the optical network devices 200A, 200B and 200C correspond to one or more of the optical NEs 102-1, 102-2, 104-1 and 104-2.

The optical network device 200A of FIG. 2A is an example of a homogenous multi-bay optical NE that includes a controller module 220A and a line card 230A as a network component. The controller 220A is configured to perform control and management plane functions for the optical network device 200A, and includes circuitry that implements telemetry manager 222A, and a plurality of application servers, such as application servers 226A-1, 226A-2, 226A-3 and 226A-4. The controller 220A also includes storage for a global subscription list 224A. The line card 230A, which is configured to process network traffic, includes circuitry implementing telemetry agent 232A, and storage for local subscription 234A. The line card 230A also includes one or more optical interface equipment, such as EQPT 236A-1 and 236A-2; and one or more logical interfaces, such as LNTF 238A-1 and LNTF 238A-2.

In some implementations, the optical network device 200A is a L1 or L0 chassis, and the line card 230A is inserted into a slot in the chassis. In such implementations, the controller 220A is a route processor/controller module for the L1/L0 chassis. The controller 220A includes one or more processors; and storage, e.g., random access memory (RAM) or flash memory, which stores control and management plane instructions for execution by the one or more processors. In some implementations, the telemetry manager circuitry 222A, and the application servers 226A-1, 226A-2, 226A-3 and 226A-4, are implemented as embedded processes run by the one or more processors by executing instructions stored in the controller module storage. In other implementations, the telemetry manager 222A is realized as an embedded controller, e.g., firmware in a field programmable gate array (FPGA) chip or application-specific integrated circuit (ASIC) chip included in the controller module 220A. In some implementations, the global subscription list 224A is stored as an electronic file in the controller module storage.

In some implementations, the line card 220A includes one or more processors; and storage, e.g., random access memory (RAM) or flash memory, which stores instructions for execution by the one or more processors. In some implementations, the telemetry agent circuitry 232A is implemented as a process that is run by the one or more processors of the line card by executing instructions stored in the line card storage. In other implementations, the telemetry agent 232A is realized as an embedded controller, e.g., firmware in a field programmable gate array (FPGA) chip or application-specific integrated circuit (ASIC) chip included in the line card 230A. In some implementations, the local subscription 234A for the line card 230A is stored as an electronic file in the line card storage.

One or more of the optical interface equipment EQPT 236A-1 and 236A-2, and the logical interfaces, LNTF 238A-1 and LNTF 238A-2, are sensor points of the optical network device 200A that record PM data or events, such as faults, during operation of the optical network device 200A in an optical network, e.g., optical network 101. In some implementations, the optical interface equipment EQPT 236A-1 and 236A-2 include switches; input or output ports, or both; or transceivers, among others. In some implementations, the logical interfaces, LNTF 238A-1 and LNTF 238A-2, include VLANs or other logical facilities provided by the line card 230A.

In some implementations, to enable streaming telemetry of PM data for the optical network device 200A, the PM collector 112 sends, to the telemetry manager 222A, global subscription list 224A. The global subscription list 224A includes a list of one or more sensor points of the optical network device 200A, e.g., one or more of EQPT 236A-1, EQPT 236A-2, LNTF 238A-1 or LNTF 238A-2, for which PM data or event data is to be streamed to the PM collector 112. In some implementations, the list of sensor points in the global subscription list is wild-carded, e.g., indicating that PM data is to be collected for all sensor points. Examples of PM data types specified by the global subscription list 224A include measurements of Q-values, bit error rate (BER), chromatic dispersion, and transmitted/received optical power, among others, for each optical carrier wavelength processed by the device.

The global subscription list 224A also specifies the frequency (cadence), e.g., the time interval (in a suitable time unit, such as milliseconds, seconds or minutes) at which the optical network device 200A is to push the recorded PM data to the PM collector 112. The global subscription list 224A further specifies the data encoding format to be used for sending the data to the PM collector 112. For example, the global subscription list can specify any of JSON, Thrift, ProtoBuf, XML, ASCII, ANSI or Unicode encoding to be used. Additionally, in some implementations, the global subscription list 224A specifies whether cumulative or incremental (e.g., delta-based) PM data is to be sent.

The telemetry manager 222A stores the global subscription list 224A in local memory, e.g., storage or persistent configuration database, of the controller 220A. The telemetry manager 222A also sends, to each of the telemetry agents managed by the telemetry manager, information from the global subscription list 224A that identifies the local subscriptions for the respective telemetry agent. For example, in some implementations, the global subscription list 224A includes EQPT 236A-1 and LNTF 238A-1 as sensor points from which PM data is to be streamed. The global subscription list 224A further specifies that the PM data from EQPT 236A-1 and LNTF 238A are to be sent every 10 milliseconds. In such cases, the telemetry manager 222A sends the PM data collection subscription information for EQPT 236A-1 and LNTF 238A to the telemetry agent 232A. In this manner, the specific information is abstracted from the global subscription list and is known only to those nodes that are part of the local domain, with deterministic schema translation between generic and specific data models.

In some implementations, the disclosed optical telemetry streaming techniques are applicable and usable in a model-driven networking (MDN) deployment, e.g., in which the PM collector specifies the sensor paths in terms of a data model, e.g., denoted by "X", and an optical NE maps this to an internal data model, e.g., denoted by "Y", with translation from X→Y and Y→X by the telemetry manager. The data model can be described in a language such as YANG (IETF RFC 6020 or other data definition languages such as SMIv2.

In some implementations, the optical telemetry streaming techniques work in an optical network in which optical network devices support declarative configuration management (DCM). In such implementations, the PM collector pushes the entire list of PM subscriptions, e.g., denoted by "A", to the optical NE. The telemetry manager in the optical NE compares the entire list A to its existent set of subscriptions, e.g., denoted by B", and determines if any new subscriptions are to be configured (e.g., A is greater than B), or if an existing subscription needs to be deleted (e.g., B is greater than A), or if the declarative push maintains the status quo (e.g., A is equal to B).

The telemetry agent 232A stores, as local subscription 234A, the subscription information that it receives from the telemetry manager 222A. Based on the information specified by the local subscription 234A, the telemetry agent 232A collects the PM data from the selected sensor points, and sends the data to the telemetry manager 222A at the frequency specified by the PM collector 112 using the global subscription list. To illustrate, continuing with the above example, based on the local subscription 234A, the telemetry agent 232A collects PM data and event information as they are recorded by EQPT 236A-1 and LNTF 238A-1. The telemetry agent 232A filters and aggregates the collected data based on the local subscription 234A, and sends the processed PM data to the telemetry manager 222A every 10 milliseconds.

The telemetry agent 232A maintains individual collector tasks that wake-up at configured intervals, collect PM data and send the data to the telemetry manager 222A. A collector task retrieves the PM data from the sensor points. The collector tasks are scheduled to run according to the configured subscription frequency. For example, a collector task can be an operating system (OS) thread or process that runs periodically as scheduled by the OS scheduler. The number of tasks at the telemetry manager (e.g., K tasks) and at the telemetry agent (e.g., I tasks) follow the relationship K≥I. However, since the telemetry manager and the telemetry agent can be running on different processors, the tasks can execute at different points in time. For example, in some implementations, the telemetry agent collector tasks run once every "nI" seconds and collect the PM data from the sensor points. The telemetry manager tasks run once every "nK" seconds, collect the data from the telemetry agents. In this manner, by decoupling telemetry agent collector tasks from telemetry manager tasks, these implementations avoid situations where too many telemetry agents push data to the centralized telemetry manager, thereby overwhelming the telemetry manager. In the disclosed implementations, the telemetry manager wakes up and fetches the PM data from each telemetry agent at its own convenience. In doing so, the disclosed implementations prioritize flow control, trading off a slight delay at which the PM data is sent to the PM collector by the telemetry manager.

The PM data is recorded by the sensor points in their respective native formats. Examples of native formats include accumulative counters, e.g., unsigned integers that always increase; and floating point integers, e.g., analog values such as power or Q-Factor performance metric, which can be either positive or negative. In some implementations, the telemetry agent 232A sends the PM data to the telemetry manager 222A in the native formats. In some implementations, the native format corresponds to raw data. Upon receiving the PM data, the telemetry manager 222A determines, from the global subscription list 224A, the encoding format at which the data is to be sent to the PM collector 112. In some implementations, the encoding format for streaming the PM data to the PM collector 112 is different from the native format at which the data is received from the telemetry agent. In such implementations, the telemetry manager 222A converts the PM data to the encoding format using one of the application servers 226A-1, 226A-2, 226A-3 and 226A-4 that corresponds to the encoding format. For example, in some cases, the encoding format for sending the PM data to PM collector 112 is Thrift encoding, and the application server 226A-3 is a Thrift server. Accordingly, the telemetry manager 222A controls application server 226A-3 to convert the PM data from the native format to Thrift encoding format. The Thrift-encoded PM data is then streamed to the PM collector 112 at the frequency specified by the global subscription list 224A. For example, the PM data is sent to the PM collector 112 every 10 milliseconds.

In the above manner, PM data is sent to the PM collector in a format that is independent of the underlying native formats supported by the optical network devices. This allows the disclosed streaming telemetry techniques to manage PM data collection for the entire network in a vendor-agnostic manner. Different optical network devices from different vendors can support various native formats. By converting the PM data to a uniform encoding specified by respective global subscription lists, the telemetry managers for the respective devices ensure that the PM collector sees the PM data in one consistent format understood by the PM collector, which is an example of MDN. Accordingly, the interpretation and representation of the PM data can be made consistent across multi-vendor optical domains.

In some implementations, the PM data is streamed using a network connection established by the application server 226A-1 over the network 110. For example, in some cases, the application server 226A-1 is a HTTP or HTTP/2 proxy server. In such cases, the PM data can be streamed to the PM collector 112 using a HTTP/2 connection established over the network 110. In some cases, the PM data is streamed in a secure manner, e.g., using TLS over HTTP/2.

In some implementations, the PM data that is collected for PM collector 112 is updated at certain time intervals. For example, the PM collector 112 can send, to the telemetry manager 222A, an updated global subscription list 224A that specifies sensor point LNTF 238A-2, in addition to the sensor points EQPT 236A-1 and LNTF 238A-1 previously indicated. The updated global subscription list further specifies a frequency of 5 milliseconds for the PM data from sensor point LNTF 238A-2, while maintaining 10 milliseconds for PM data from EQPT 236A-1 and LNTF 238A-1. Upon receiving the updated global subscription list 224A, the telemetry manager 222 sends, to the telemetry agent 232A, an updated local subscription that now includes collecting PM data for LNTF 238A-2 at 5 millisecond frequency. Accordingly, the telemetry agent 232A starts collecting PM data from LNTF 238A-2 and sending to the telemetry manager 222A at 5 millisecond frequency, for streaming to the PM collector 112 after converting to the encoding format. In addition, the telemetry agent 232A continues to collect PM data from EQPT 236A-1 and LNTF 238A-1 and sending to the telemetry manager 222A at 10 millisecond frequency, as also specified by the updated subscription. In a similar manner, one or more sensor points can be removed from an updated global subscription list. Further, the collection frequency for one or more sensor points previously subscribed can be changed, in addition or as an alternative to, adding new sensor points or removing existing sensor points. In this manner, a dynamic, subscription-based streaming telemetry is implemented to send PM data from optical NEs in an optical network to a remote collector server.

In some implementations, the optical network device 200A supports streaming telemetry for two or more PM collectors. The streaming telemetry for the different PM collectors can be for different types of PM data, from different sensor points, at different frequencies, using different encoding formats, or any suitable combination of these. For example, in some implementations, a first PM collector, e.g., PM collector 112, collects PM data for sensor points EQPT 236A-1 and LNTF 238A-1 at 10 millisecond frequency using Thrift encoding, as described above. In addition, the telemetry manager 222A supports telemetry for a second PM collector, which collects PM data for sensor points EQPT 236A-1, EQPT 236A-2 and LNTF 238A-2 at 1 millisecond frequency using JSON encoding. The telemetry manager 222A and the telemetry agent 232A store the global subscription list and the local subscription, respectively, for the second PM collector in their respective local storage. The telemetry manager 222A uses another application server that is a JSON application server, e.g., application server 226A-2, to convert the PM data from the native format to the JSON encoding format for sending to the second PM collector.

The optical network device 200B of FIG. 2B is another example of a multi-bay optical NE that includes a controller module 220B and a plurality of network components, such as line cards 230B-1, 230B-2 and 230B-3. In some implementations, the controller 220B is configured to perform control and management plane functions for the optical network device 200B, and includes circuitry that implements telemetry manager 222B, and a plurality of application servers, such as application servers 226B-1, 226B-2, 226B-3 and 226B-4. The controller 220B also includes storage for a global subscription list 224B.

Each of the line cards 230B-1, 230B-2 and 230B-3 is configured to process network traffic. The line cards 230B-1, 230B-2 and 230B-3 each includes circuitry implementing telemetry agent 232B-1, 232B-2 and 232B-3, respectively, and storage for respective local subscription 234B-1, 234B-2 and 234B-3. Each line card also includes one or more optical interface equipment and one or more logical interfaces. For example, line card 230B-1 includes one or more optical interface equipment such as EQPT 236B-1, and one or more logical interfaces such as LNTF 238B-1; line card 230B-2 includes one or more optical interface equipment such as EQPT 236B-2, and one or more logical interfaces such as LNTF 238B-2; and line card 230B-3 includes one or more optical interface equipment such as EQPT 236B-3, and one or more logical interfaces such as LNTF 238B-3.

In some implementations, the optical network device 200B is with the line cards 230B-1, 230B-2 and 230B-3 inserted into slots of the chassis. In some implementations, the optical network device 200B is same as one of the optical NEs 104-1 or 104-2.

In some implementations, the controller 220B is similar to the controller 220A, and each of the line cards 230B-1, 230B-2 and 230B-3 is similar to the line card 230A. In such implementations, the optical interface equipment EQPT 236B-1, EQPT 236B-2 and EQPT 236B-3 are similar to the optical interface equipment EQPT 236A-1 or EQPT 236A-2, while the logical interfaces LNTF 238B-1, LNTF 238B-2 and LNTF 238B-3 are similar to the logical interfaces LNTF 238A-1 or LNTF 238A-2.

In some implementations, the operation of the telemetry manager 222B is similar to the operation of the telemetry manager 222A, while the operations of the telemetry agents 232B-1, 232B-2 and 232B-3 are similar to the operation of the telemetry agent 232A. The telemetry manager 222B stores the global subscription list 224B, which it receives from the PM collector 112, in local memory, e.g., storage or persistent configuration database, of the controller 220B. The telemetry manager 222B also sends, to each of the telemetry agents managed by the telemetry manager, information from the global subscription list 224B that identifies the local subscriptions for the respective telemetry agent. For example, the telemetry manager 222B sends the subscription for line card 230B-1 to telemetry agent 232B-1, which stores the subscription information as local subscription 234B-1. The local subscription 234B-1 specifies PM data collection parameters, e.g., list of sensor points or frequency (cadence), among others, from one or more sensor points of the line card 230B-1, such as EQPT 236B-1 and LNTF 238B-1. The telemetry manager 222B sends the subscription for line card 230B-2 to telemetry agent 232B-2, which stores the subscription information as local subscription 234B-2. The local subscription 234B-2 specifies PM data collection parameters from one or more sensor points of the line card 230B-2, such as EQPT 236B-2 and LNTF 238B-2. The telemetry manager 222B further sends the subscription for line card 230B-3 to telemetry agent 232B-3, which stores the subscription information as local subscription 234B-3. The local subscription 234B-3 specifies PM data collection parameters from one or more sensor points of the line card 230B-3, such as EQPT 236B-3 and LNTF 238B-3.

Based on the information specified by the respective local subscription, each telemetry agent collects the PM data from the selected sensor points in its line card, and sends the data to the telemetry manager 222B at the specified frequency. For example, based on the local subscription 234B-1, telemetry agent 232B-1 collects PM data and event information recorded by one or more sensor points, e.g., EQPT 236B-1 or LNTF 238B-1, and sends the collected data to the telemetry manager 222B at the specified frequency. Similarly, telemetry agents 232B-2 and 232B-3 collect PM data and event information recorded by one or more respective sensor points, e.g., EQPT 236B-2 or LNTF 238B-2, or EQPT 236B-3 or LNTF 238B-3, and send the collected data to the telemetry manager 222B at the respective specified frequencies.

The telemetry agents send the PM data to the telemetry manager 222B in the native formats of their respective sensor points. In some implementations, telemetry manager 222B receives PM data from the telemetry agents 232B-1, 232B-2 and 232B-3 in more than one native format. The telemetry manager 222B converts the PM data from respective native formats to the encoding format for streaming, as specified by the global subscription list 224B, using one of the application servers 226B-1, 226B-2, 226B-3 and 226B-4 that corresponds to the encoding format, and pushes the data to the PM collector 112, e.g., as described with respect to FIG. 2A. Similar to the telemetry manager 222A, in some implementations, the telemetry manager 222B receives updated global subscription list from the PM collector 112 from time to time, and sends, to one or more of the telemetry agents 232B-1, 232B-2 and 232B-3, updates to their respective local subscriptions, if any. According to the updates, the telemetry manager 222B updates the type of PM data it streams, the frequency of streaming, or the encoding format, among other parameters.

FIG. 2C illustrates optical network device 200C, which is another example of a multi-bay optical NE. The optical network device 200C includes a plurality of sub-NEs, such as sub-NEs 240, 250 and 260. In some implementations, the optical network device 200C is an example of a heterogeneous multi-bay optical NE that supports network components with different types of functions. In such implementations, one or more of the sub-NEs 240, 250 and 260 process L1 network traffic (e.g., in the digital domain), while the other sub-NEs process L0 traffic (e.g., in the optical domain). For example, in some cases, sub-NE is a L1 chassis with a plurality of L1 line cards that perform traffic switching; sub-NE 250 is a F/ROADM or an amplifier with a plurality of line cards that either multiplex or amplify optical signals; and sub-NE 260 is a digital terminal device for converting Ethernet (L1) data from an Ethernet switch or router into the optical (L0) domain. In some implementations, the optical network device 200C is similar to a combination of optical NEs 102-1 and 104-1, or optical NEs 102-2 and 104-2.

As shown, each of the sub-NEs 240, 250 and 260 of the optical network device 200C includes a controller module, e.g., controllers 220C, 220D and 220E, respectively. In some implementations, the controllers 220C, 220D and 220E are similar to controller 220A or controller 220B. In some implementations, controller 220C acts as the master controller for streaming telemetry. In such implementations, controller 220C includes circuitry that implements telemetry manager 222C, and a plurality of application servers, such as application servers 226C-1, 226C-2, 226C-3 and 226C-4. The controller 220C also includes storage for a global subscription list 224C. Each of the other controllers, e.g., controller 220D and 220E, includes circuitry implementing telemetry agents 232D and 232E, respectively, and storage for respective local subscriptions 234D and 234E.

In the sub-NE 250, telemetry agent 232D in controller 220D acts as a centralized telemetry agent that manages PM data collection across all the network components in the sub-NE, e.g., from line cards 230D-1 and 230D-2 that are included in the sub-NE 250, and reports the PM data to the telemetry manager 222C. For example, depending on the specifications in the local subscription 234D, telemetry agent 232D collects PM data from one or more sensor points such as optical network interfaces EQPT 236D-1 and EQPT 236D-2, or logical interfaces LNTF 238D-1 and 238D-2, or any combination of these. The telemetry agent 232D sends the PM data from the sensor points in their respective native format(s) to the telemetry manager 222C.

In the sub-NE 260, telemetry agent 232E collects, depending on the specifications in the local subscription 234E, PM data from one or more local sensor points, such as optical network interfaces EQPT 236E-1 and EQPT 236E-2, or logical interfaces LNTF 238E-1 and 238E-2, or any combination of these. The telemetry agent 232E sends the PM data from the sensor points in their respective native format(s) to the telemetry manager 222C.

In addition, in sub-NE 240, controller 220C includes a telemetry agent 232C to manage PM data from the network components included in the sub-NE, such as line cards 230C-1 and 230C-2. The controller 220C also stores a corresponding local subscription 234C for all the local network components. The telemetry manager 222C sends, to the telemetry agent 232C, sections of the global subscription list 224C that are specific to the network components of sub-NE 240; these sections are saved by telemetry agent 232C as the local subscription 234C.

In some implementations, each of the line cards 230C-1 and 230C-2 includes, and is managed by, its own telemetry agent, e.g., in a configuration similar to optical network device 200B. In such implementations, the controller 220C does not include telemetry agent 232C or local subscription 234C.

In a manner similar to that described with respect to optical network devices 200A and 200B, the telemetry agents 232C, 232D and 232E report PM data collected from sensor points of their respective sub-NEs to the telemetry manager 222C. Types of PM data from a terminal device (such as sub-NE 260 in some implementations) include, for example, measurements of Q-values, BER, chromatic dispersion, and transmitted/received optical power, among others, for each optical carrier wavelength processed by the device. Types of PM data from an F/ROADM or amplifier device (such as sub-NE 250 in some implementations) include, for example, EDFA transmitted/received optical power and laser bias current.

The telemetry manager 222C is configured to manage PM data collection from the telemetry agents spread across the different sub-NEs in the optical network device 200C, convert the PM data from various native formats to the encoding format specified by the global subscription list 224C, and stream the encoded PM data to the PM collector 112 over the network 110, e.g., performing operations similar to those described with respect to telemetry manager 22A or 224B, or both.

Accordingly, the system 100 and the optical network devices 200A, 200B and 200C can be used to enable streaming telemetry of PM data in an optical network, in the manner described above. By providing features to the telemetry manager to convert PM data from various native formats to various encoding formats customized for different PM collectors, the disclosed techniques support multilingual data abstraction instantiations. The use of subscription lists to specify the parameters for PM data collection, including selected sensor points, allow programmatic representations of manageable entities, e.g., sensor points in a network component, in an optical network device.

In some implementations, one or more of the telemetry agents described above are configurable by users of respective optical network devices. For example, a network operator deploying optical network device 200C in a network can develop and deploy one or more of the telemetry agents 232C, 232D or 232E. The telemetry agents can reside on the optical device as manageable software service, and interface with different layers of the system software (e.g., management plane) depending upon the desired level of control. In some implementations, one or more of the telemetry agents can be implemented as multi-purpose system monitoring agents.

In some implementations, the PM collector 112 performs network analytics using the streamed PM data, in addition to passive and active network monitoring. The disclosed techniques extend network analytics to WAN optical transport networks, e.g. optical network 101. Analytics are used to extract insights into network optimization, e.g., adjusting placement of optical network devices, upgrading device hardware, among others. In some implementations, network analytics are combined with machine-learning to optimize the network. By allowing the PM collector to obtain streaming telemetry data from various optical network devices in a vendor-agnostic manner, e.g., irrespective of different native data formats, the challenges due to heterogeneity in technology, in failure modes, and in performance metrics between different devices can be overcome. In this manner, the disclosed streaming telemetry implementations offer both scale and flexibility in terms of automation framework, PM data and time-scales analytics.

Figure 3:
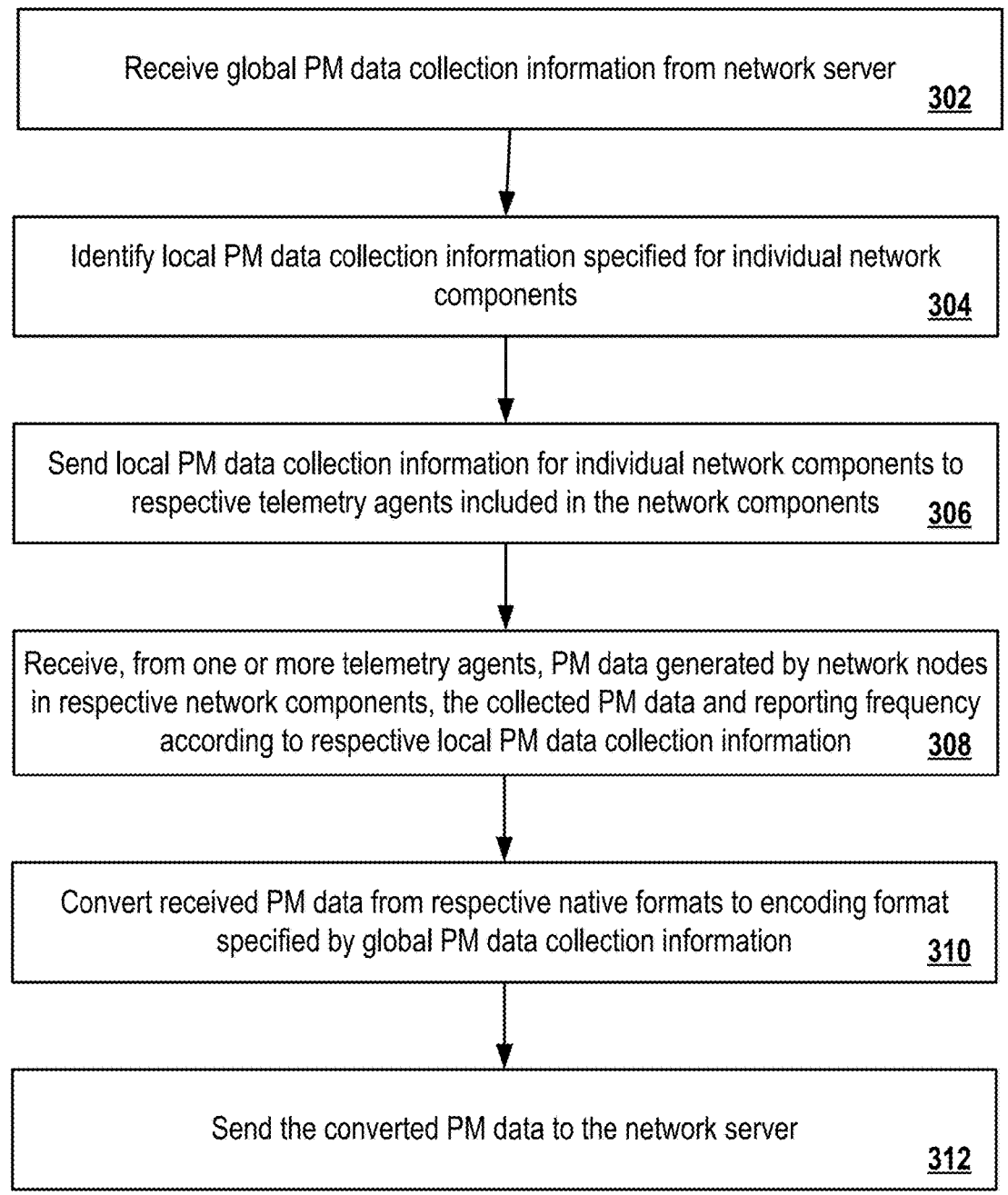
FIG. 3 illustrates an example of a process to perform streaming telemetry by an optical network device.

FIG. 3 illustrates an example of a process 300 to perform streaming telemetry by an optical network device. In some implementations, the process 300 is performed by a telemetry manager in an optical NE, e.g., telemetry manager 222A, 22B or 222C, to manage PM data collection from network components and streaming the collected data to a telemetry server, e.g., PM collector 112. Accordingly, the following sections describe the process 300 with respect to the telemetry managers 222A, 222B and 222C. However, the process 300 also can be performed by other circuitry and devices.

The process 300 starts when a telemetry manager receives global PM data collection information from a telemetry server (302). For example, the telemetry manager 222A, 222B or 222C receives global subscription list 224A, 224B or 222C, respectively, from PM collector 112. As discussed previously, each telemetry manager stores respective global subscription list in local storage.

The telemetry manager identifies local PM data collection information specified for individual network components (304). For example, telemetry manager 222B parses the global subscription list 224B and identifies local subscription information for line card 230B-1, which specifies one or more corresponding sensor points, e.g., EQPT 236B-1 or LNTF 268B-1, for PM data collection and a frequency for the PM data collection. The telemetry manager 222B identifies local subscription information for line cards 230B-2 and 230B-2 in a similar manner. As another example, telemetry manager 222C parses the global subscription list 224C and identifies local subscription information for the sub-NE 240, which specifies one or more sensor points in the included line cards, e.g., line card 230C-1 or 230C-2, or both, for PM data collection and a frequency for the PM data collection for these sensor points. Similarly, telemetry manager 222C also identifies local subscription information for the line cards in the sub-NE 250, e.g., line cards 230D-1 or 230D-2, or both; and local subscription information for one or more sensor points in the sub-NE 260, e.g., EQPT 236E-1, EQPT 236E-2, LNTF 238E-1 or LNTF 238E-2.

The telemetry manager sends local PM data collection information for individual network components to respective telemetry agents included in the network components (306). For example, telemetry manager 222B sends local subscription information for line cards 230B-1, 230B-2 and 230B-3 to respective telemetry agents 232B-1, 232B-2 and 232B-3. As another example, telemetry manager 222B sends local subscription information for sub-NEs 240, 250 and 260 to respective telemetry agents 232C, 232D and 232E.

The telemetry manager receives, from one or more telemetry agents, PM data generated by network nodes in respective network components, the collected PM data and reporting frequency according to respective local PM data collection information (308). For example, telemetry manager 222B receives PM data from one or more of the telemetry agents 232B-1, 232B-2 and 232B-3. Telemetry agent 232B-1 sends PM data, if any, collected from one or more sensor points EQPT 236B-1 and LNTF 238B-1, as specified by the local subscription 234B-1. Telemetry agent 232B-1 follows the reporting frequency for sending the PM data as specified by the local subscription 234B-1. Similarly, telemetry agent 232B-2 sends any available PM data collected from one or more sensor points EQPT 236B-2 and LNTF 238B-2 as specified by the local subscription 234B-2, and at the reporting frequency specified by the local subscription 234B-2; and telemetry agent 232B-3 sends any available PM data collected from one or more sensor points EQPT 236B-3 and LNTF 238B-3 specified by the local subscription 234B-3, at the reporting frequency specified by the local subscription 234B-3.

The telemetry manager converts the received PM data from respective native formats to encoding format specified by global PM data collection information (310). For example, the telemetry agents 232B-1, 232B-2 and 232B-3 send PM data to the telemetry manager 222B in the native format in which the data are recorder by their respective sensor points, e.g., as raw data. Upon receiving the PM data, the telemetry manager 222B converts the PM data from respective native format(s) to the encoding format specified by the global subscription list 224B. As described previously, the telemetry manager 222B uses an application server that supports the specified encoding format, e.g., one of application servers 226B-1, 226B-2, 226B-3 and 226B-4, to convert the PM data to the specified encoding format.

The telemetry manager sends the converted PM data to the network server (312). For example, after converting the PM data received from one or more telemetry agents 232B-1, 232B-2 and 232B-3 from respective native format(s) to the specified encoding format, the telemetry manager 222B sends the converted PM data in the encoding format to the PM collector 112. In some implementations, the telemetry manager 222B sends the PM data to the PM collector at the reporting frequency specification by the global subscription list 224B. In some implementations, the telemetry manager 222B sends the PM data over a network connection through the network 110, e.g., using a HTTP or HTTP/2 connection. In some implementations, the network connection is a secure connection, e.g., secured using TLS or SSH.

Figure 4:
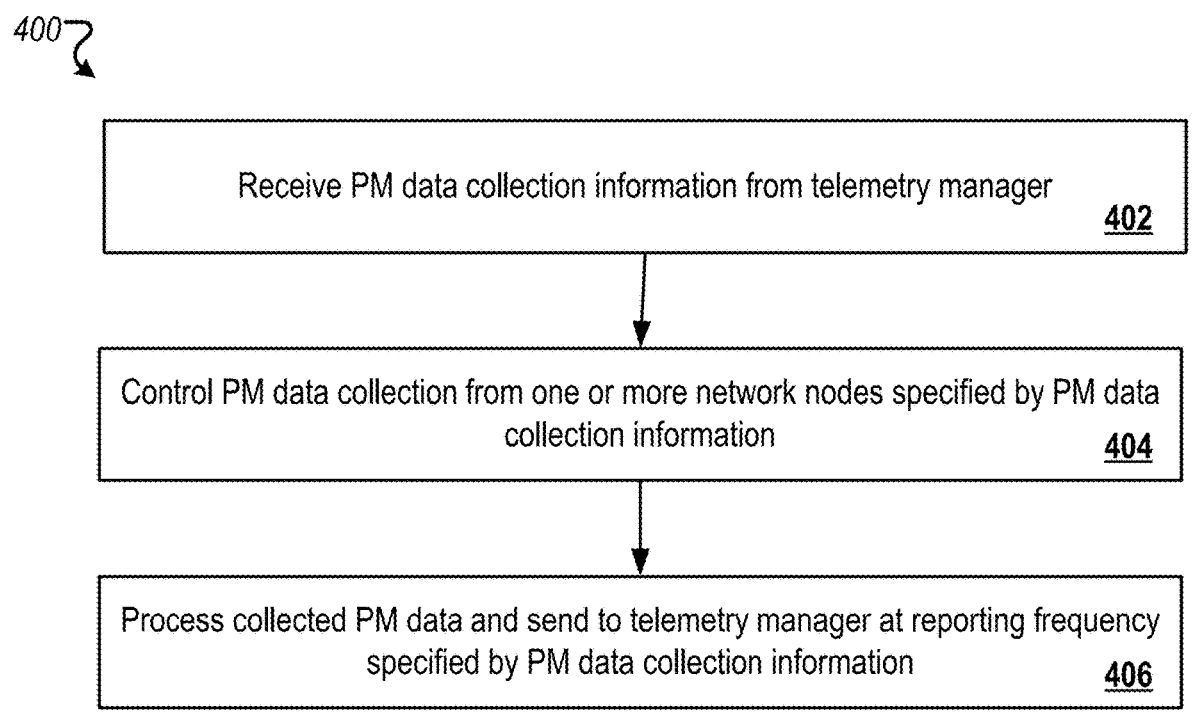
FIG. 4 illustrates an example of a process to perform streaming telemetry by an optical network device.

FIG. 4 illustrates an example of a process 400 to perform streaming telemetry by an optical network device. In some implementations, the process 400 is performed by a telemetry agent in an optical NE, e.g., any of telemetry agent 232A, 232B-1, 232B-2, 232B-3, 232C, 232D or 232E, to manage PM data collection from sensor points in a respective network component, and send the PM data to a corresponding telemetry manager, e.g., telemetry manager 222A, 222B or 222C. Accordingly, the following sections describe the process 400 with respect to the telemetry agents 232A, 232B-1, 232B-2, 232B-3, 232C, 232D and 232E. However, the process 400 also can be performed by other circuitry and devices.

In some implementations, the process 400 is performed in conjunction with the process 300. For example, the telemetry manager performs the process 300 while each telemetry agent performs the process 400 so that the telemetry manager and telemetry agents can work together to collect PM data from sensor points, and send the PM data to a PM collector server.

The process 400 starts when a telemetry agent receives PM data collection information from a telemetry manager (402). For example, the telemetry agent 232A receives local subscription 234A from telemetry manager 222A. Similarly, telemetry agents 232B-1, 232B-2 and 232B-3 receive respective local subscriptions 234B-1, 234B-2 and 234B-2 from telemetry manager 222B; and telemetry agents 232C, 232D and 232E receive respective local subscriptions 234C, 234D and 234E from telemetry manager 222C.

The telemetry agent controls PM data collection from one or more network nodes specified by PM data collection information (404). For example, telemetry agent 232A sets collector tasks for one or more sensor points EQPT 236A-1, EQPT 236A-2, LNTF 238A-1 and LNTF 238A-2, depending on the PM data to be collected for the line card 230A, as specified by the local subscription 234A. Using these collector tasks, the telemetry agent 232A collects PM data recorded by the target sensor points. The PM data is collected in the native formats of the respective sensor points. Similarly, telemetry agents 232B-1, 232B-2 and 232B-3 collect PM data from sensor points in their respective line cards, as specified by respective local subscriptions 234B-1, 234B-2 and 234B-2; and telemetry agents 232C, 232D and 232E collect PM data from sensor points in their respective sub-NEs, as specified by respective local subscriptions 234C, 234D and 234E.

The telemetry agent processes collected PM data and sends to telemetry manager at reporting frequency specified by PM data collection information (406). For example, telemetry agent 232A filters and aggregates the PM data collected from the target sensor points in the line card 230A, and sends the PM data to the telemetry manager 222A at the reporting frequency specified by the local subscription 234A. Similarly, telemetry agents 232B-1, 232B-2 and 232B-3 filter and aggregate PM data collected from sensor points in their respective line cards, and send to the telemetry manager 222B using reporting frequencies specified by respective local subscriptions 234B-1, 234B-2 and 234B-2; and telemetry agents 232C, 232D and 232E filter and aggregate PM data from sensor points in their respective sub-NEs, and send to the telemetry manager 222B using reporting frequencies specified by respective local subscriptions 234C, 234D and 234E.

Implementations of the disclosure and all of the functional operations described in this specification may be realized in digital electronic circuitry, or in computer software, firmware, or hardware, including the structures disclosed in this specification and their structural equivalents, or in combinations of one or more of them. Implementations of the disclosure may be realized as one or more computer program products, i.e., one or more modules of computer program instructions encoded on a computer-readable medium for execution by, or to control the operation of, data processing apparatus. The computer readable medium may be a non-transitory computer readable storage medium, a machine-readable storage device, a machine-readable storage substrate, a memory device, a composition of matter effecting a machine-readable propagated signal, or a combination of one or more of them. The term "data processing apparatus" encompasses all apparatus, devices, and machines for processing data, including by way of example a programmable processor, a computer, or multiple processors or computers. The apparatus may include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal that is generated to encode information for transmission to suitable receiver apparatus.

A computer program (also known as a program, software, software application, script, or code) may be written in any form of programming language, including compiled or interpreted languages, and it may be deployed in any form, including as a stand-alone program or as a module, component, subroutine, or other unit suitable for use in a computing environment. A computer program does not necessarily correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program may be deployed to be executed on one computer or on multiple computers that are located at one site or distributed across multiple sites and interconnected by a communication network.

The processes and logic flows described in this specification may be performed by one or more programmable processors executing one or more computer programs to perform functions by operating on input data and generating output. The processes and logic flows may also be performed by, and apparatus may also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. Computer readable media suitable for storing computer program instructions and data include all forms of non-volatile memory, media, and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory may be supplemented by, or incorporated in, special purpose logic circuitry.

To provide for interaction with a user, implementations of the disclosure may be realized on a computer that is coupled to a display device, e.g., a monitor, for displaying information to the user and a keyboard and a pointing device, e.g., a mouse or a trackball, by which the user may provide input to the computer. Other kinds of devices may be used to provide for interaction with a user as well; for example, feedback provided to the user may be any form of sensory feedback, e.g., visual feedback, auditory feedback, or tactile feedback; and input from the user may be received in any form, including acoustic, speech, or tactile input.

Implementations of the disclosure may be realized in a computing system that includes a back end component, e.g., as a data server, or that includes a middleware component, e.g., an application server, or that includes a front end component, e.g., a client computer having a graphical user interface or a Web browser through which a user may interact with an implementation of the disclosure, or any combination of one or more such back end, middleware, or front end components. The components of the system may be interconnected by any form or medium of digital data communication, e.g., a communication network. Examples of communication networks include a local area network ("LAN") and a wide area network ("WAN"), e.g., the Internet.

The computing system may include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of any disclosure or of what may be claimed, but rather as descriptions of features that may be specific to particular implementations of particular disclosures. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the implementations described above should not be understood as requiring such separation in all implementations, and it should be understood that the described program components and systems can generally be integrated together in a single software product or packaged into multiple software products.

The invention claimed is:

1. A system, comprising:
    an optical network device comprising:
        a controller node that includes a telemetry manager, wherein the telemetry manager is configured to:
            receive, from a network server, global data collection information about one or more network components corresponding to the optical network device, wherein the global data collection information includes one or more of identifiers for network nodes in the one or more network components from which telemetry data are to be collected, reporting frequency for sending collected telemetry data to the network server, or encoding format for sending collected telemetry data to the network server;

identify, from the global data collection information, local data collection information specified for a particular network component of the one or more network components;

send, to a telemetry agent included in the particular network component, the local data collection information;

receive, at a time subsequent to sending the local data collection information to the telemetry agent, particular telemetry data generated by a particular network node of the particular network component, the telemetry data provided in accordance with instructions included in the local data collection information, the particular telemetry data provided in a particular native format of the particular network node;

determine an encoding format specified by the global data collection information for forwarding collected data to the network server;

convert the particular telemetry data from the particular native format to the specified encoding format; and send the particular telemetry data in the specified encoding format to the network server.

2. The system of claim 1, wherein the local data collection information specified for a particular network component is a first local data collection information, and wherein the telemetry manager is configured to:

identify, from the global data collection information, second local data collection information specified for a second network component of the one or more network components;

send, to a second telemetry agent included in the second network component, the second local data collection information;

receive, at a time subsequent to sending the second local data collection information to the second telemetry agent, second telemetry data generated by a network node of the second network component in a second native format, the second telemetry data provided in accordance with instructions included in the second local data collection information, the telemetry data provided in the second native format that is different from the particular native format;

convert the second telemetry data from the second native format to the specified encoding format; and send the second telemetry data in the specified encoding format to the network server.

3. The system of claim 2, wherein the telemetry manager receives:

the particular telemetry data at a first reporting frequency specified by the particular local data collection information, and the second telemetry data at a second reporting frequency specified by the second local data collection information, the second reporting frequency being different from the first reporting frequency and wherein the telemetry manager is configured to:

send the particular telemetry data to the network server at the first reporting frequency; and send the second telemetry data to the network server at the second reporting frequency.

4. The system of claim 2, wherein the telemetry manager receives:

the particular telemetry data at a first reporting frequency specified by the particular local data collection information, and the second telemetry data at a second reporting frequency specified by the second local data collection information, the second reporting frequency being different from the first reporting frequency and wherein the telemetry manager is configured to:

send the particular telemetry data to the network server at a third reporting frequency that is different from at least one of the first reporting frequency or the second reporting frequency.

5. The system of claim 1, wherein the network server is a first network server, the global data collection information is a first global data collection information and the encoding format is a first encoding format, and wherein the telemetry manager is further configured to:

receive, from a second network server, second global data collection information about one or more network components corresponding to the optical network device;

identify, from the second global data collection information, second local data collection information specified for the particular network component;

send, to the telemetry agent included in the particular network component, the second local data collection information;

receive, at a time subsequent to sending the second local data collection information to the telemetry agent, second telemetry data generated by the particular network node, the second telemetry data provided in accordance with instructions included in the second local data collection information, the second telemetry data provided in the particular native format;

determine a second encoding format specified by the second global data collection information for forwarding collected data to the second network server;

convert the second telemetry data from the native format to the second encoding format; and send the second telemetry data in the second encoding format to the second network server.

6. The system of claim 1, wherein the telemetry manager is configured to:

receive, from the network server, updated global data collection information about the one or more network components;

identify, from the updated global data collection information, updated local data collection information for the particular network component of the one or more network components;

send, to the telemetry agent included in the particular network component, the updated local data collection information;

receive, at a time subsequent to sending the updated local data collection information to the telemetry agent, new telemetry data generated by the particular network node and second telemetry data generated by a second network node of the particular network component, the new telemetry data and the second telemetry data provided in accordance with instructions included in the updated local data collection information, the new telemetry data provided in particular native format of the particular network node and the second telemetry data provided in a second native format of the second network node;

determine an encoding format specified by the updated global data collection information for forwarding collected data to the network server;

convert the new telemetry data from the particular native format to the encoding format specified by the updated global data collection information;
convert the second telemetry data from the second native format to the encoding format specified by the updated global data collection information; and
send the new telemetry data and the second telemetry data to the network server.

7. The system of claim 6, wherein the telemetry manager sends the particular telemetry data to the network server at a first reporting frequency specified by the global data collection information, and
wherein the telemetry manager sends at least one of the new telemetry data or the second telemetry data to the network server at a second reporting frequency specified by the updated global data collection information, the second reporting frequency being different from the first reporting frequency.

8. The system of claim 1, wherein the telemetry agent is configured to:
receive, from the telemetry manager, the local data collection information; and
in accordance with the instructions included in the local data collection information:
control the particular network node to collect the particular telemetry data generated by the particular network node in the particular native format, and
send the particular telemetry data in the particular native format to the telemetry manager at a first reporting frequency specified by the local data collection information.

9. The system of claim 8, wherein collecting the particular telemetry data comprises filtering the collected telemetry data in accordance with the instructions included in the local data collection information, and aggregating the filtered telemetry data for a time interval corresponding to the first reporting frequency, and
sending the particular telemetry data comprises sending the filtered and aggregated telemetry data to the telemetry manager.

10. The system of claim 8, wherein the telemetry agent is further configured to:
receive, from the telemetry manager, updated local data collection information that is generated by the telemetry manager in response to receiving updated global data collection information from the network server, the updated local data collection information specifying the particular network node and a second network node of the particular network component from which telemetry data is to be collected; and
in accordance with the instructions included in the updated local data collection information:
control the particular network node to collect new telemetry data generated by the particular network node in the particular native format,
control the second network node to collect second telemetry data generated by the second network node in a second native format of the second network node, and
send, to the telemetry manager, the new telemetry data in the particular native format and the second telemetry data in the second native format.

11. The system of claim 10, wherein the telemetry agent is configured to send the new telemetry data at the first reporting frequency specified by the updated local data collection information, and send the second telemetry data at a second reporting frequency specified by the updated local data collection information.

12. The system of claim 1, wherein the local data collection information includes one or more of: identifiers for network nodes from which telemetry data are to be collected, reporting frequency for sending collected telemetry data to the network server, or encoding format for sending collected telemetry data to the network server.

13. The system of claim 1, wherein the optical network device is one of:
an integrated multi-bay optical device or a disaggregated optical device,
wherein the one or more network components include one or more of: a physical layer line card, an optical line card, an optical add-drop multiplexer, an optical amplifier, or a digital terminal device, and
wherein the particular network node is one of: a switch, an input port, an output port, a transmitter, a receiver, an optical interface equipment, a virtual local area network (VLAN), or a logical interface.

14. The system of claim 1, wherein the particular native format is raw data, and wherein the encoding format is one of Protocol Buffers (ProtoBuf), Thrift, Extensible Markup Language (XML) or JavaScript Object Notation (JSON).

15. The system of claim 1, wherein the optical network device is an integrated multi-bay optical network device.

16. A non-transitory computer-readable medium storing instructions that, when executed by one or more processors, are configured to cause the one or more processors to:
receive, from a network server, global data collection information about one or more network components corresponding to an optical network device, wherein the global data collection information includes one or more of identifiers for network nodes in the one or more network components from which telemetry data are to be collected, reporting frequency for sending collected telemetry data to the network server, or encoding format for sending collected telemetry data to the network server;
identify, from the global data collection information, local data collection information specified for a particular network component of the one or more network components;
send, to a telemetry agent included in the particular network component, the local data collection information;
receive, at a time subsequent to sending the local data collection information to the telemetry agent, particular telemetry data generated by a particular network node of the particular network component, the telemetry data provided in accordance with instructions included in the local data collection information, the particular telemetry data provided in a particular native format of the particular network node;
determine an encoding format specified by the global data collection information for forwarding collected data to the network server;
convert the particular telemetry data from the particular native format to the specified encoding format; and
send the particular telemetry data in the specified encoding format to the network server.

17. The non-transitory computer-readable medium of claim 16, wherein the local data collection information specified for a particular network component is a first local data collection information, and wherein the instructions cause the one or more processors to:

identify, from the global data collection information, second local data collection information specified for a second network component of the one or more network components;

send, to a second telemetry agent included in the second network component, the second local data collection information;

receive, at a time subsequent to sending the second local data collection information to the second telemetry agent, second telemetry data generated by a network node of the second network component in a second native format, the second telemetry data provided in accordance with instructions included in the second local data collection information, the telemetry data provided in the second native format that is different from the particular native format;

convert the second telemetry data from the second native format to the specified encoding format; and send the second telemetry data in the specified encoding format to the network server, wherein the particular telemetry data is received at a first reporting frequency specified by the local data collection information and the second telemetry data is received at a second reporting frequency specified by the second local data collection information, the second reporting frequency being different from the first reporting frequency, and wherein the particular telemetry data is sent to the network server at the first reporting frequency, and the second telemetry data is sent to the network server at the second reporting frequency.

18. The non-transitory computer-readable medium of claim 16, wherein the instructions further cause the one or more processors to:

receive, by the telemetry agent, the local data collection information; and in accordance with the instructions included in the local data collection information:
control the particular network node to collect the particular telemetry data generated by the particular network node in the particular native format, and
send the particular telemetry data in the particular native format to a telemetry manager at a first reporting frequency specified by the local data collection information.

19. A method comprising:

receiving, from a network server, global data collection information about one or more network components corresponding to an optical network device, wherein the global data collection information includes one or more of identifiers for network nodes in the one or more network components from which telemetry data are to be collected, reporting frequency for sending collected telemetry data to the network server, or encoding format for sending collected telemetry data to the network server;

identifying, from the global data collection information, local data collection information specified for a particular network component of the one or more network components;

sending, to a telemetry agent included in the particular network component, the local data collection information;

receiving, at a time subsequent to sending the local data collection information to the telemetry agent, particular telemetry data generated by a particular network node of the particular network component, the telemetry data provided in accordance with instructions included in the local data collection information, the particular telemetry data provided in a particular native format of the particular network node;

determining an encoding format specified by the global data collection information for forwarding collected data to the network server;

converting the particular telemetry data from the particular native format to the specified encoding format; and sending the particular telemetry data in the specified encoding format to the network server.

20. The method of claim 19, wherein the local data collection information specified for a particular network component is a first local data collection information, the method further comprising:

identifying, from the global data collection information, second local data collection information specified for a second network component of the one or more network components;

sending, to a second telemetry agent included in the second network component, the second local data collection information;

receiving, at a time subsequent to sending the second local data collection information to the second telemetry agent, second telemetry data generated by a network node of the second network component in a second native format, the second telemetry data provided in accordance with instructions included in the second local data collection information, the telemetry data provided in the second native format that is different from the particular native format;

converting the second telemetry data from the second native format to the specified encoding format; and sending the second telemetry data in the specified encoding format to the network server, wherein the particular telemetry data is received at a first reporting frequency specified by the local data collection information and the second telemetry data is received at a second reporting frequency specified by the second local data collection information, the second reporting frequency being different from the first reporting frequency, and wherein the particular telemetry data is sent to the network server at the first reporting frequency, and the second telemetry data is sent to the network server at the second reporting frequency.

21. The method of claim 19, further comprising:

receiving, by the telemetry agent, the local data collection information; and in accordance with the instructions included in the local data collection information:
controlling the particular network node to collect the particular telemetry data generated by the particular network node in the particular native format, and
sending the particular telemetry data in the particular native format to a telemetry manager at a first reporting frequency specified by the local data collection information.

22. The method of claim 19, wherein the optical network device is an integrated multi-bay optical network device.

* * * * *